Nov. 30, 1954  A. WEISENBURG  2,695,650
MACHINE FOR APPLYING SEALING PADS TO CROWN CAPS
Filed Aug. 9, 1951  10 Sheets-Sheet 2

Fig. 2.

INVENTOR
Andrew Weisenburg.
BY Mason, Porter, Diller & Stewart
ATTORNEYS

Nov. 30, 1954  A. WEISENBURG  2,695,650
MACHINE FOR APPLYING SEALING PADS TO CROWN CAPS
Filed Aug. 9, 1951  10 Sheets-Sheet 3

Nov. 30, 1954  A. WEISENBURG  2,695,650
MACHINE FOR APPLYING SEALING PADS TO CROWN CAPS
Filed Aug. 9, 1951  10 Sheets-Sheet 10

INVENTOR
Andrew Weisenburg

BY Mason, Porter, Diller & Stewart
ATTORNEYS

United States Patent Office 2,695,650
Patented Nov. 30, 1954

2,695,650

MACHINE FOR APPLYING SEALING PADS TO CROWN CAPS

Andrew Weisenburg, Langhorne, Pa., assignor to Continental Can Company, Inc., New York, N. Y., a corporation of New York Application August 9, 1951, Serial No. 241,048

9 Claims. (Cl. 154—1.5)

The invention relates to new and useful improvements in a machine for applying sealing pads to closure caps and more particularly to crown caps used for sealing bottles and the like.

An object of the invention is to provide a machine wherein the crown caps are moved in a straight line through the machine from the receiving end to the presser wheel by a continuous uniform movement and while moving an adhesive is applied to the inner surface of the top of the crown cap and then a pad inserted in the crown cap and pressed against the adhesive.

A further object of the invention is to provide a pad applying machine of the above type wherein the crowns are moved through the machine by a rotating shaft having a uniform spiral rib adapted to engage the crowns of the caps.

A still further object of the invention is to provide a machine of the above type wherein the crown caps are stripped from a crown supplying chute by a rotating arm which conveys the cap to the supporting guideways therefor in timed relation with the rotation of the shaft so that the spiral rib thereon will engage the crown at the rear side thereof and force the same along the guideways.

A still further object of the invention is to provide a machine of the above type wherein the pads are placed over the moving crown caps by two independently operated pad feeding devices timed so as to supply pads to alternate caps.

A still further object of the invention is to provide a machine of the above type wherein there is associated with the pad supplying devices a detector mechanism which operates when there is no crown to receive a pad for rendering the pad feeding mechanism inoperative.

A still further object of the invention is to provide a machine of the above type with a detector provided with arms preferably carrying magnets on the ends thereof which arms move into the crown caps and if there is no pad in the cap then the magnet will attract the cap and move it into a path of travel which ejects it from the machine.

A still further object of the invention is to provide a machine of the above type wherein there are two duplicate lines of crown cap feeding devices and wherein each line includes an adhesive applying mechanism, pad feedings devices and a detector, and wherein a single presser wheel having plungers at each side thereof receives the crowns from the two lines and after the adhesive has been set discharges the crowns from the machine.

In the drawings, which show by way of illustration one embodiment of the invention.

In the present illustrated embodiment of the invention the machine for applying sealing pads to crown caps includes two independent feed lines for the caps. Each feed line includes guideways for supporting the cap by the flange thereof and a shaft having a spiral rib of uniform helix angle for feeding the crown caps in succession along the guideways. There is a feed chute for each feed line and the stripper for each chute having arms for positively engaging a cap in the chute and moving the cap from the chute into the guideway in timed relation to the rotation of the feed shaft so that the crown caps will be placed between adjacent turns of the spiral rib on the shaft. The crown caps are first presented to an adhesive applying device including a series of rotating radial arms having pads contacting an adhesive applying cylinder, and then the moving caps for placing an adhesive on the inner side of the top of the cap. The crown caps are next presented to a sealing pad applying device. There are two of these sealing pad applying devices associated with each feed line and they are timed so as to place the pads in alternate caps on the feed line. Associated with each device for placing a sealing pad over a crown cap is a rotating plunger which contacts the sealing pad and forces it against the adhesive in the cap while the cap is moving.

After the pads have been applied to the crown caps they are next presented to a detector device which enters the cap and if there is no pad in the cap it will discharge the cap from the machine. The feed shaft with its spiral rib delivers the crown caps with the pads therein into a transfer disk having open pockets to receive the caps. There is a presser wheel common to the two lines of feed. On each side of the presser wheel is a series of plungers which are spring pressed radially outwardly toward an annular supporting member carried by the presser wheel. These plungers are retracted as they pass over the pocketed cap supplying device and then they are released so as to enter the cap and press the pad against the cap and the cap against the annular supporting member. Extending part way around the presser wheel at each side thereof is a heating element which heats the member supporting the crowns which transfers heat to the cap and thus the adhesive is firmly set while traveling with the presser wheel. After the adhesive has been set the plungers are raised to release the caps for discharge from the machine and while raised another cap is placed beneath the same for engagement by the plunger when released from the control cam.

The two independent feed lines and the associated units for applying the pads to the crown caps are similar in construction. One of the feed lines and associated devices will be described in detail and reference numerals applied thereto. The numerals with primes will be applied to some of the elements in the other line.

The machine includes a supporting frame structure 10. There are horizontal supporting plates 11 extending from one end of the machine to the other and these plates are spaced from a central plate 12 a distance slightly greater than the crown of the cap but less than the overall diameter of the flange of the cap. (See Figure 7). The plates at their opposed upper edges are chamfered as indicated at 13. There are cover plates 14 and 15 which are spaced from each other so that access to the interior of the cap can be had.

Figures 6, 7, 8:
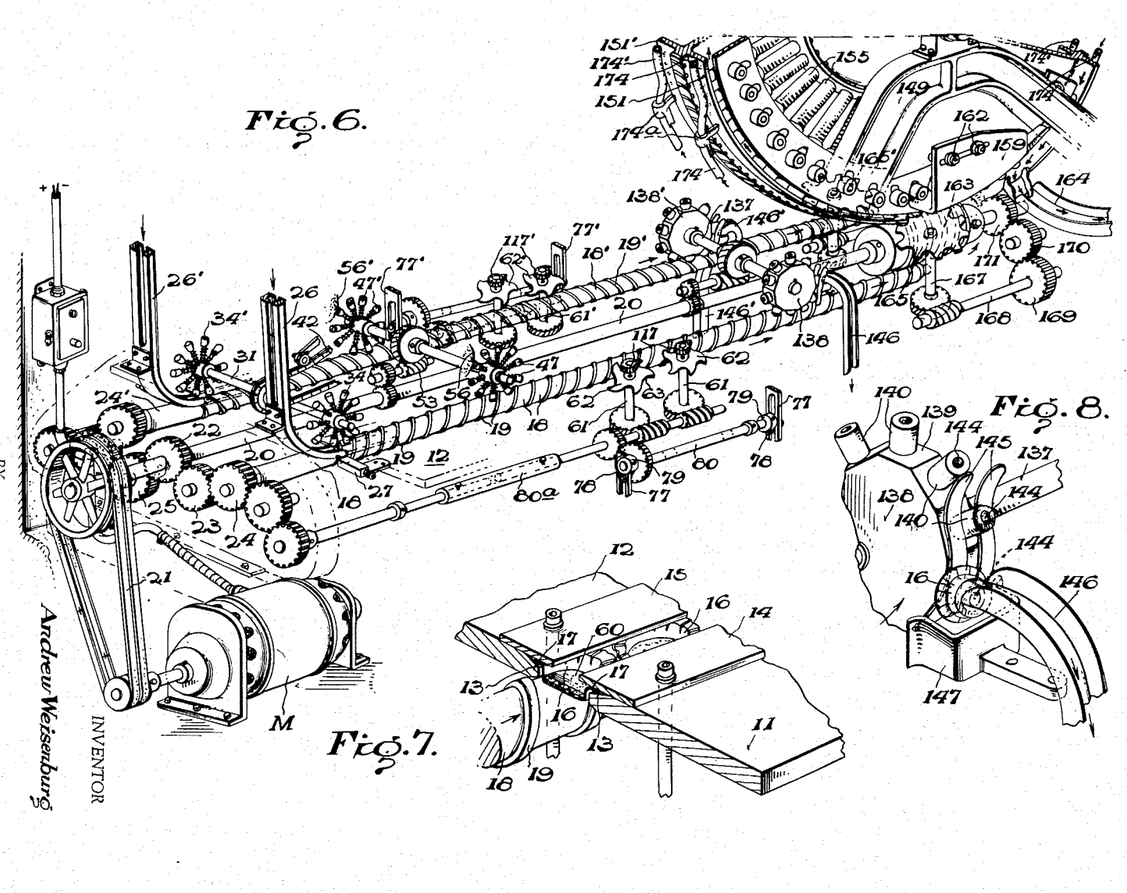
Figure 6 is a skeleton view in perspective showing the driving means for the various units of the machine.
Figure 7 is a view partly in section and partly in perspective showing the guide rails, the cover plates and a portion of the feed shaft with the spiral rib thereon.
Figure 8 is a view in perspective showing a portion of one of the detectors and the means associated therewith for stripping caps without pads from the detector.
Figures 9, 10, 11:
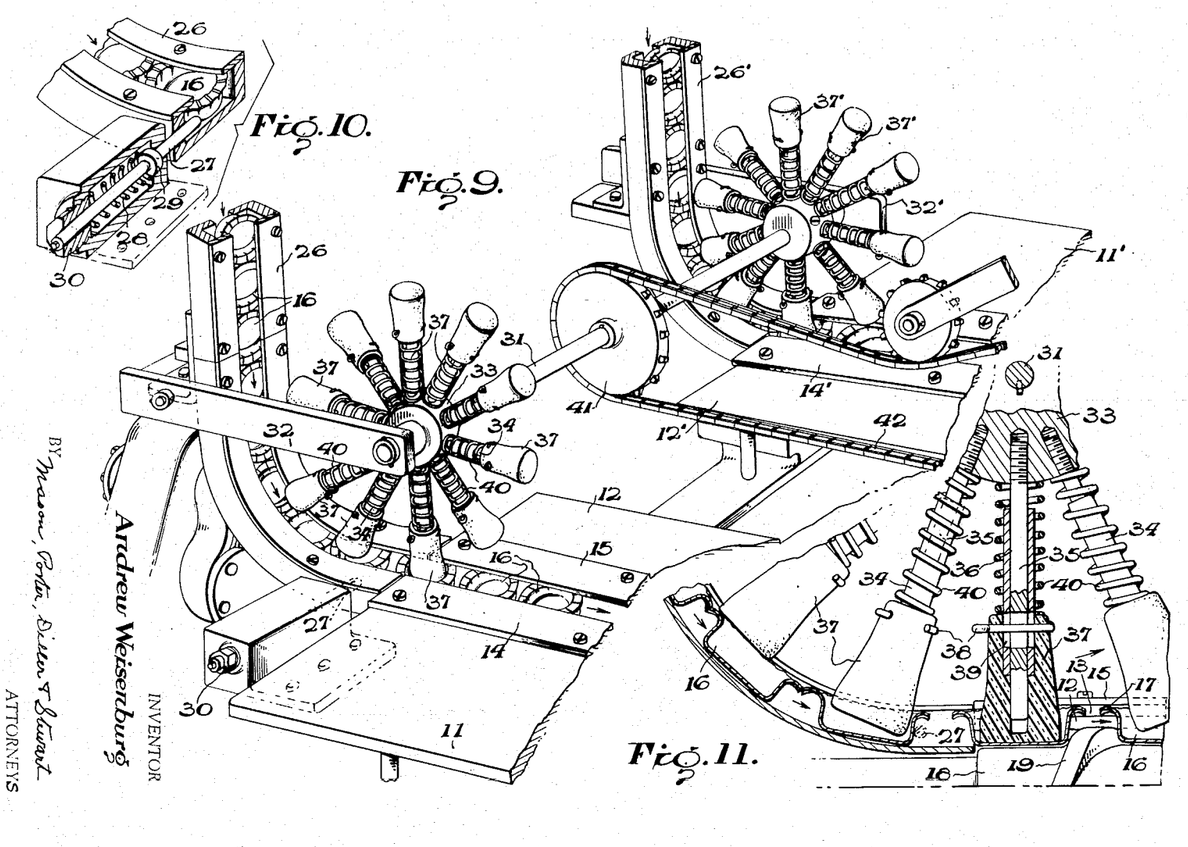
Figure 9 is a view in perspective showing the stripping devices at both sides of the machine for stripping caps from supply chutes and placing the same in the guideways therefor and in timed relation so that the rib on the feed shaft will engage behind the crown cap and move it along the guideways.
Figure 10 is a view partly in perspective and partly in section showing the detaining pin for stopping the flow of caps through the chute while permitting the cap to be forcibly withdrawn from the retaining means.
Figure 11 is a view partly in section showing the rotating arms that strip the caps from the chute and the manner of placing the cap so that it will be engaged at the rear side thereof by the rib on the feed shaft.
Figure 12:
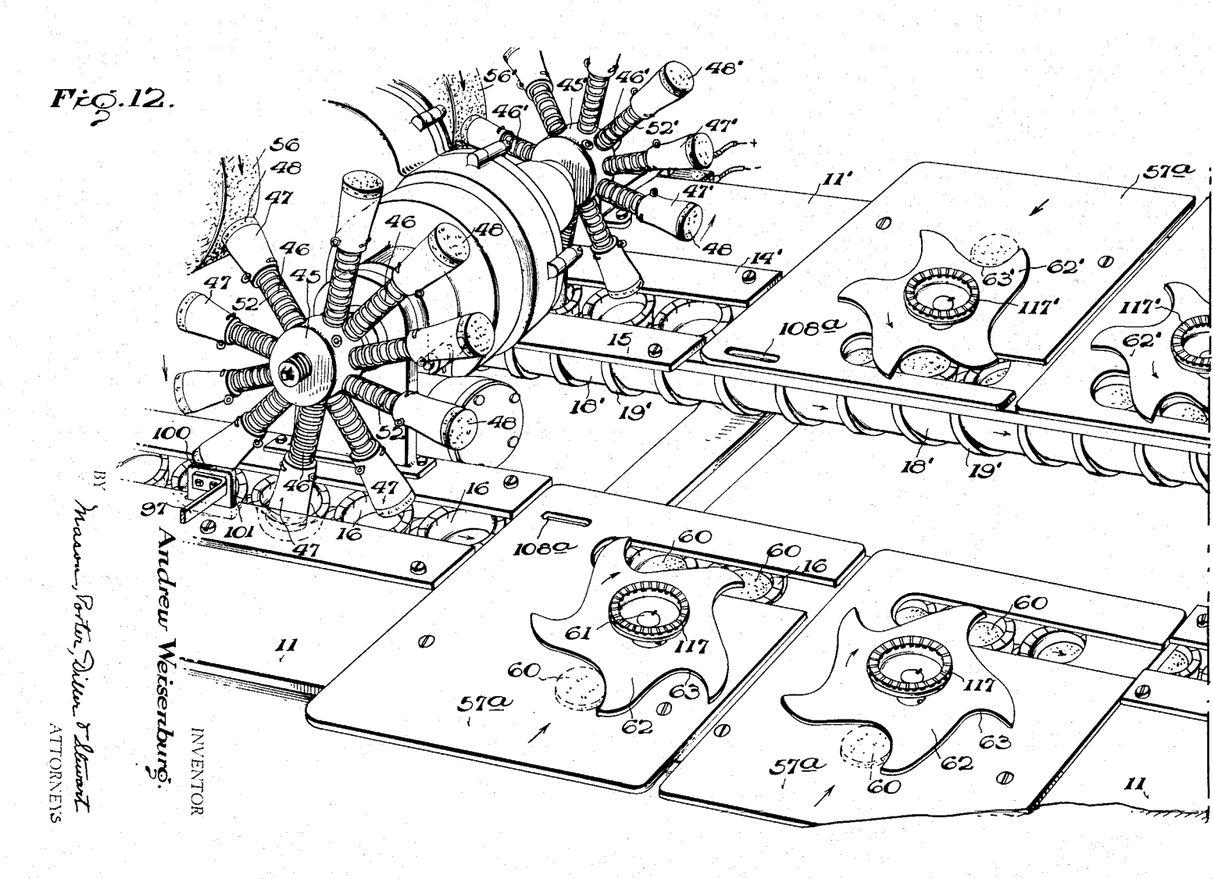
Figure 12 is a view in perspective showing a portion of the adhesive applying devices and showing the feed wheels for the several pad applying devices.

The crown cap is shown in Figure 7 at 16. The flanges 17 of the cap extend into the guideway formed by the chamfered portion 13 and the cover plates and thus the crown cap is supported so that it can move freely along the guideway.

The caps are moved along the guideway by a rotating shaft 18 having a spiral rib 19 of uniform helix angle carried thereby. The pitch of this spiral thread is slightly greater than the diameter of the crown of the cap so that the rib will engage the crown portion of the cap beneath the flanges thereon for moving the same along the guideways. There is a main shaft 20 extending from one end of the machine to the other and located centrally thereof. This shaft is driven by a motor M through driving belts 21. On this shaft is a gear 22 and power from the shaft is transmitted through the gear 23 to a gear 24 on the end of one of the feed shafts and through a gear 25 to the feed shaft 24' at the other side of the machine.

*Cap supply and means for delivering caps one at a time to the feed line of the machine*

The caps are fed from a suitable supply into a chute 26 with all of the caps in the chute facing in the same direction. These caps will slide down the chute by gravity to the lower end thereof where they engage a pin 27 extending through one of the walls of the chute into the path of movement of the crown portion of the cap. This pin is urged into the chute by a spring 28 bearing against a collar 29 fixed to the pin at its inner end and against an adjustable abutment 30 at its outer end. This pin will hold the caps from movement until they are forcibly stripped from the chute when the pin will yield to permit one cap at a time to be taken from the chute.

The caps are stripped from the chute one at a time and positively fed into the guideway therefor and in timed relation to the rotation of the shaft carrying the spiral rib so that the rib will move in behind the crown of the cap and force it along the guideway. This means for stripping the caps from the chute includes a shaft 31 mounted in brackets 32, 32' and a stripping wheel mounted thereon. The stripping wheel includes a hub 33 having radially projecting arms 34. Each arm includes a central rod 35 on which is mounted a sleeve 36. Mounted on the end of the sleeve and the end of the rod is a plunger head 37. A pin 38 passes through the head and through a slot 39 in the sleeve and a slot in the rib 35. A spring 40 abuts against the head and against the hub and holds the head in its extreme outward position. The shaft 31 is so positioned that these plungers, one after another, will move into the crown cap and the plunger will contact with the crown cap and center it so that it will pass from the chute over the shaft in proper timing for a rib 19 on the shaft 18 to engage behind the crown portion of the cap and force it along the guideways formed between the cover plate and the chamfered edge portion 13. The plunger head 37 will place the spring 36 under tension and this will hold the cap firmly positioned for entrance into the guideway and onto the shaft. The shaft 31 is driven by a sprocket wheel 41 and the sprocket wheel 41 is driven by a sprocket chain 42 from a sprocket wheel on the shaft 43 which is a part of the adhesive applying mechanism.

*Adhesive applying mechanism*

The crown caps are fed by the rib 19 on the feed shaft 18 to an adhesive applying mechanism. The adhesive applying mechanism on the two feed lines are duplicates as to the supplying of the adhesive to the crown caps, and they are operated from a common source. Each adhesive applying mechanism includes a shaft 44 on which is mounted a hub 45 carrying a series of radially extending arm 46 on the ends of which are mounted plunger heads 47 each carrying a felt pad 48. This plunger head is mounted on a sleeve 49 which has a limited movement on the arm 46. There is a slot 50 in the arm and a pin 51 passing through the slot into the plunger head. A spring 52 abuts against the plunger head at one end and the hub at the other end. This permits the plunger head to have a slight yield as it applies the adhesive to the crown cap. These arms carried by the hub 45 are so positioned and timed that they will move into a crown cap as it is fed along the guideways therefor without in any way retarding the movements of the crown caps. The shaft 44 is driven by a worm gearing 53 which in turn is driven by a gear on the main shaft 20. See Figure 6. There is a trough 54 for the adhesive and the usual pick-up roller 55 which delivers adhesive to an adhesive supplying roll or cylinder 56. The shaft supporting this pick-up roll and the adhesive supply cylinder are operated by suitable gearing connection with the shaft 44.

*Sealing pad applying devices*

There are two pad applying mechanisms for each feed line of crown caps. These mechanisms are timed so that one of the pad feeding mechanisms will feed pads to alternate caps and the other pad feeding mechanism will feed pads to the remaining alternate caps. These pad feeding mechanisms are identical in construction and operation and a detailed description of one will answer for the other and in general the same numerals will be applied to both mechanisms.

Figure 24:
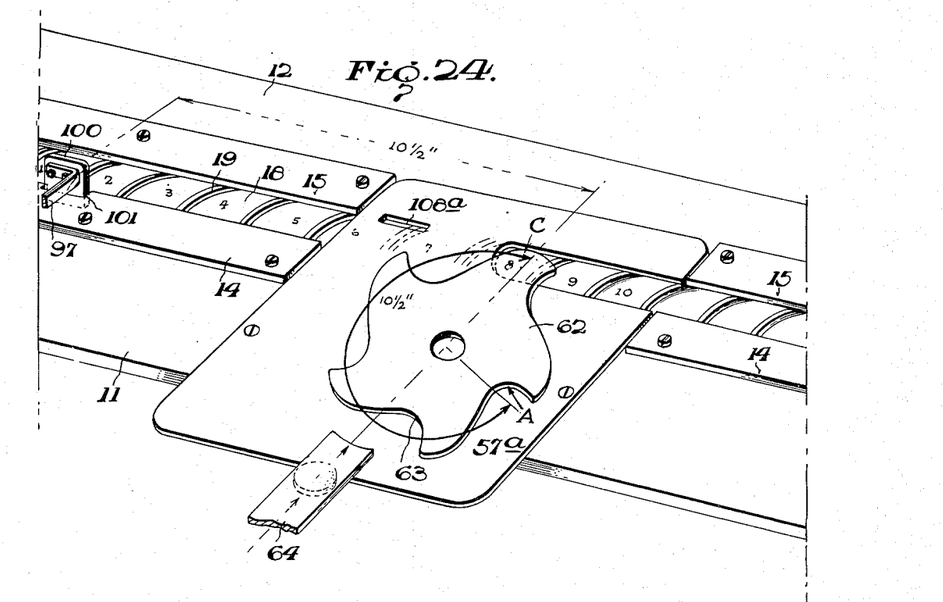
Figure 24 is a view in perspective showing a portion of the feed shaft and transfer wheel for transferring a pad to a position over the feed shaft and also showing the relative position of the detector for rendering the feed of the pads ineffective when there is no cap to receive the pad.
Figure 25:
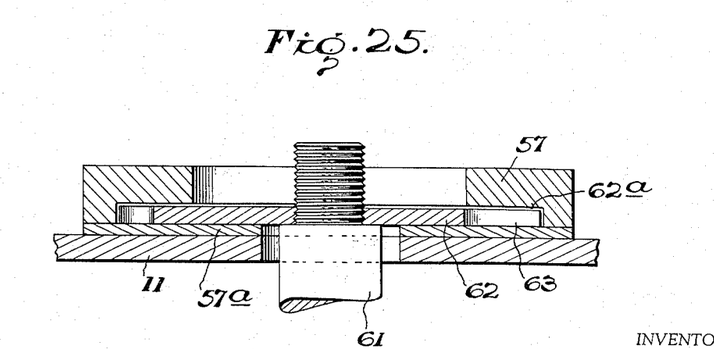
Figure 25 is a transverse section through the pad transfer disk showing the shaft for operating the same and the housing for the disk.

As shown in Figure 24, the cover plates 14 and 15 are cut away in the region where a pad applying mechanism is located. Mounted on the plates 11 and 12 and between the ends of the cover plates is a relatively thin plate 57ª. This plate 57ª is secured to the plate 11 and extends across the slot or space directly above the feed shaft. The purpose of this plate 57ª will be more fully described later. The pad feeding mechanism includes a base plate 57 which is secured to the plate 57ª and the plate 11 beneath the same by suitable bolts. Mounted in bearings in this base plate is a vertically disposed shaft 61 carrying a gear 117 at the upper end thereof. Mounted on this shaft is a star wheel 62 having pad receiving pockets 63. This star wheel is mounted for rotation directly above the plate 57a and is disposed in a recess 62a formed in the underside of the base plate 57. Mounted in this base plate 57 is a magazine 59 in which the pads indicated at 60 are stacked one on another. These pads are preferably formed of granular cork and they are preformed and dimensioned for insertion in the crown cap so as to provide a sealing pad therefor. The pads are fed from the stack into the pockets of the star wheel by a reciprocating slide 64. Attached to the base plate 57 is a bracket 65. The feed slide is provided with ribs 66 which engage in suitable recesses beneath the cover plates 67, 67. (See Figure 16.)

Figure 2:
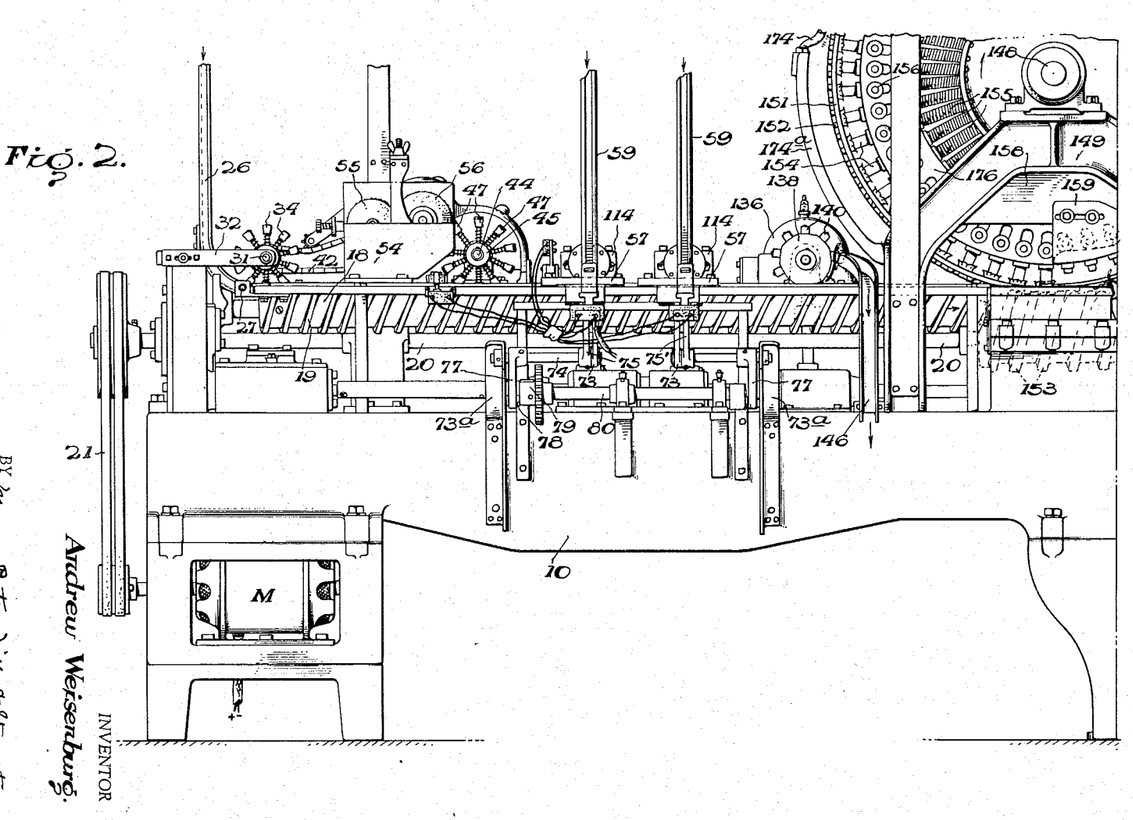
Figure 2 is a side elevation of the same.

Beneath the slide is a head 68 which is also provided with ribs 69 which move back and forth in guideways 70, 70 in plates carried by the bracket 65. The head 68 is provided with a slot 71. (See Figure 17.) Extending across the slot is a pin 72. Beneath the bracket 65 is a depending lug 73. There is a shaft 74 mounted at one end in this lug and at its other end in a bracket 73a. (See Figure 2.) The shaft has an upstanding arm 75 rigidly secured thereto. The upper end of the arm is forked at 76 and engages the pin 72. As the shaft 74 is oscillated the head 68 will move back and forth in a relatively fixed path of travel. The shaft is oscillated by a depending forked arm 77 which engages a crank pin 78 eccentrically set on a sleeve 79 fixed to the shaft 80. As the shaft 80 rotates it will oscillate the shaft 74 and this will move the head 68 back and forth in its guiding recesses in the bracket 65.

Mounted on the head 68, or formed as a part thereof, is a cross bar 81. (See Figure 17.) Attached to the outer end of the slide 64 is a bracket 82. A latch 83 is mounted on a pivot pin 84 carried by the bracket 82. Attached to the latch is a laterally extending arm 85. The outer end of the arm 86 contacts with a cam plate 87 which is pivoted at 88 on a pivot pin carried by upstanding lugs on a bracket 89. This cam plate 87 has an opening through the free end thereof. A limiting bolt 90 extending through the opening is threaded into the bracket 65. There is a spring 91 on this bolt which normally holds the cam plate pressed upwardly against the head on the bolt. Inasmuch as the bolt passes freely through the cam plate it may be moved downwardly on the bolt compressing the spring when the arm 85 is moved downwardly. This cam plate 87 on its upper face has two levels separated by an inclined portion 92.

Figures 16, 17, 18:
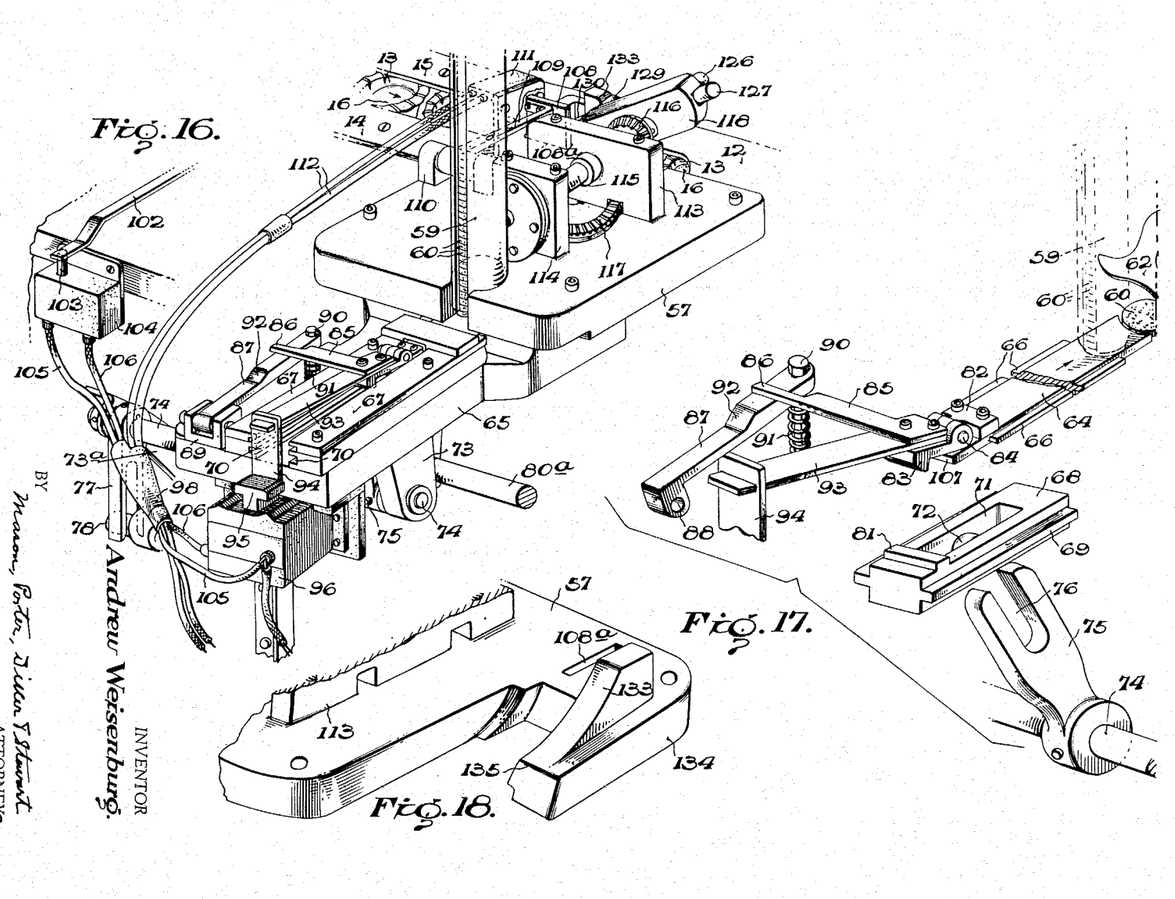
Figure 16 is a perspective view of the devices for feeding a pad from a stack to the transfer device which places the pad over the cap, also showing a portion of one of the detecting devices which renders the pad feeding mechanism inoperative when there is no crown cap to receive the pad.
Figure 17 is a view in perspective showing the slide operating and control devices which take one pad at a time from the stack and places it in the transfer device for placing the pad over the cap.
Figure 18 is a perspective view of a portion of the base plate of the pad feeding device and showing the cam which controls the plunger that forces the pad from the transfer device into the cap.

Rigidly attached to the latch 83 is a flat arm 93. This flat arm extends through a vertically disposed plate 94 carried by the armature 95 of a solenoid 96. When the solenoid is energized it will pull the flat arm 93 downwardly and this will move the arm 85 downwardly and if the parts are positioned as shown in Figure 17, it will depress the cam plate 87. This downward movement of the arm 93 forces the latch 83 downwardly so that the bar 81 on the reciprocating head 68 will be engaged by the latch and the slide moved outwardly away from the magazine when said head is moving on its outward stroke.

Assuming that the parts are postioned as shown in Figure 17 with the slide at the forward end of the stroke, and that the solenoid is energized so that the latch is positioned whereby the block 81 will engage the latch and retract the slide, thus drawing the slide from underneath the magazine and the stacked pads will move down onto the plate 57a. On the next forward movement of the head 68 it will contact the end 107 of the slide and move it forward, stripping the lowermost pad from the magazine and placing the same in a pocket 63 in the star wheel 62. The star wheel rotates in a clockwise direction and will place the pads received in its pockets directly over the crown caps moved along the guideway by the rotating shaft and spiral rib carried thereby.

As has already been noted the pad feeding mechanism feeds pads over alternate caps. This is accomplished in the following manner. The shaft 61 is geared to the shaft 80a and likewise the shaft 80 is geared to the shaft 80a so that both shafts are driven from the shaft 80a. The gears driving shaft 80 are dimensioned so that said shaft is driven at one half the speed of the feed shaft 18. The gears driving the shaft 61 are dimensioned so that said shaft is driven at one tenth the speed of the feed shaft 18. Referring to Figure 24, which shows the feed slide at the forward end of its stroke and in dotted lines the pad resting on the feed slide, we are assuming that the solenoid is maintained energized and the latch is in position to be engaged by the reciprocating head 68. This head is timed so that the slide is moved outward to receive a pad from the magazine on one rotation of the feed shaft and moves inwardly to place the pad in a pocket of the star wheel on another revolution of the feed shaft. The star wheel is timed so that a pocket is positioned to receive a pad when the slide moves forward and while the slide is being retracted to receive another pad the star wheel moves one-tenth of a revolution or one-half way between the pockets therein and while the slide is moving forward with the next pad the star wheel will move another one-tenth of a revolution and bring the next pocket into position to receive a pad. The distance between the pockets and the timing of the star wheel is such that pads will be placed over alternate caps. The other pad feeding mechanism operates in the same way but is timed so that the star wheel will place pads over the remaining alternate caps.

*Presence of crown caps control the feeding of pads*

Figure 1:
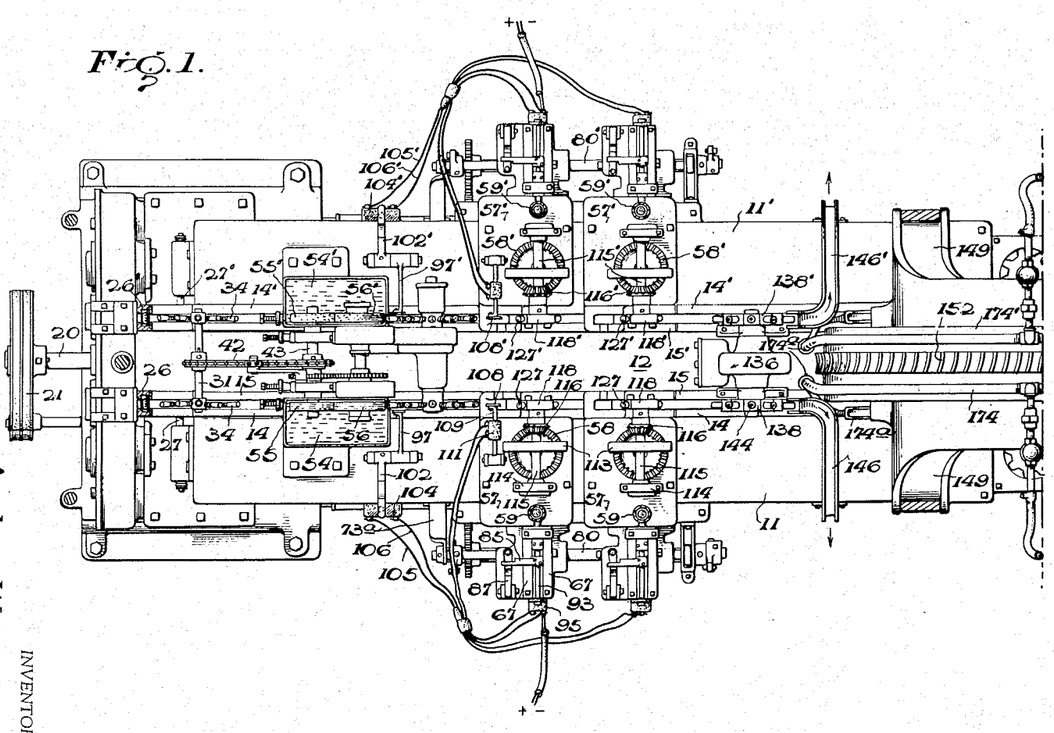
Figure 1 is a plan view of the machine showing more or less diagrammatically the various associated devices for applying the pads to the crown caps.
Figures 13, 14, 15:
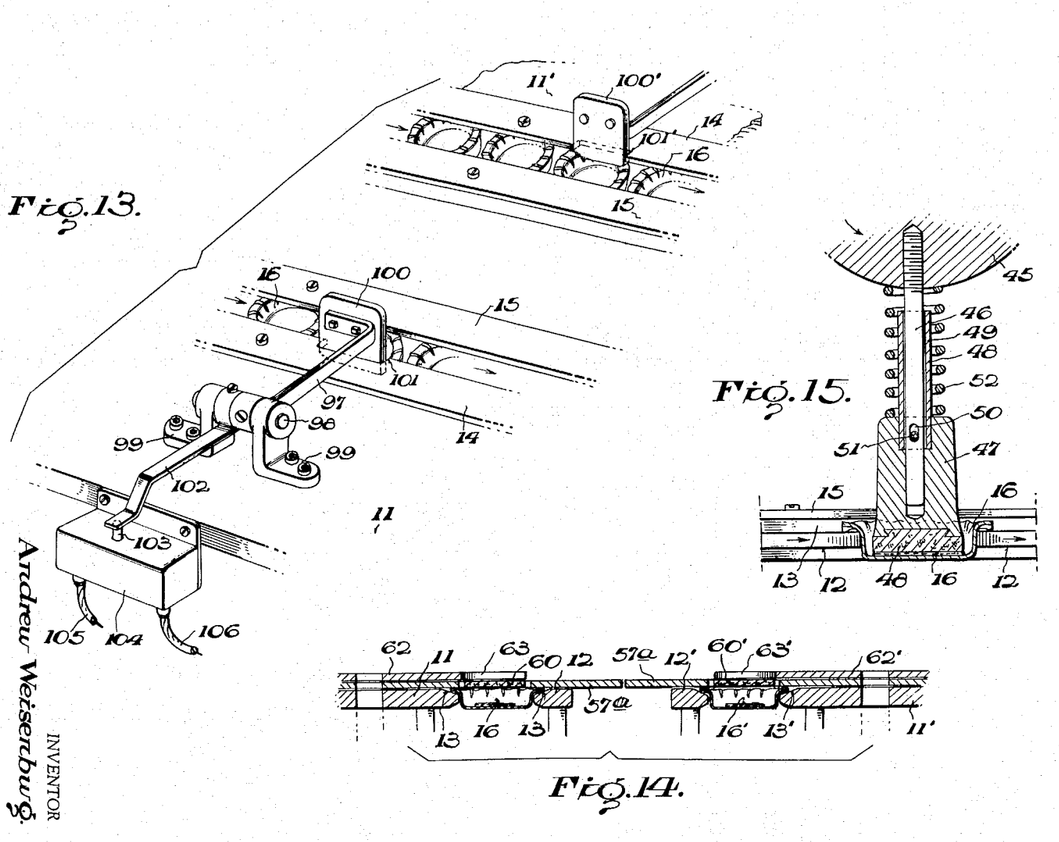
Figure 13 is a view in perspective showing one of the detector levers and the associated switch for detecting the absence or presence of a crown cap and which initiates the devices for rendering the pad feeding device inoperative when there is no crown to receive the pad.
Figure 14 is a view in section showing part of the pad feeding mechanism with the pad therein placed over the crowns ready for insertion therein, the crowns on both lines of pad applying devices being shown in this figure.
Figure 15 is a view showing one of the arms with the felt pad for applying the adhesive to the inner surface of the top of the crown cap while it is moving.

It is very desirable that no pad shall be placed over the space between convolutions of the feeding rib unless there is a cap to receive the pad. Associated with each cap feeding mechanism as shown in Figures 1, 13 and 16, is a detector device which rides on the crown caps as they move along the feed line. If for any reason there is no crown cap to receive a pad then the pad feeding mechanism is rendered inoperative. This detector mechanism includes an arm 97 rigidly fixed to a shaft 98 supported by brackets 99, 99. (See Figure 13.) On the outer end of this arm 97 is a shoe 100 which extends down through a notched out portion 101 in the cover plate 14. The lower edge of the shoe will contact with the flange of the crown cap if there is one present in the feed line. If there is no cap then this shoe will move downward by its weight. The shoe has a tapered end which the caps approach as they move along the guideway. This shoe 100 is of sufficient length so that when there is a cap in each space between the ribs of the feed wheel the shoe will ride from one cap onto the other. This will hold the arm 97 raised. The shoe, however, is of a width so that if there is no cap present in one of the spaces between the ribs the shoe will drop into the space and the arm 97 will be lowered. The next cap, however, to approach the shoe will engage the tapered end and lift it to its raised position. Mounted on the shaft 98 is an arm 102. When the shoe 100 is raised this arm 102 is depressed and will engage an operating pin 103 of a micro-switch 104. When the switch is closed then the solenoid will be energized. This is accomplished by lines 105 and 106 leading from the micro-switch to the solenoid. When the solenoid is energized then the latch will be lowered so that it will contact with the cross bar 81 and when the head 68 is moved outwardly the slide will be withdrawn from beneath the stack and on the forward movement of the head it will engage the end 107 of the slide 64 and move it forward carrying the pad in front of the slide into a pocket of the star wheel.

The pad is released from the magazine by the slide and placed in a pocket of the star wheel which is remote from the position where the pad is placed over the crown cap in the feed line and therefore the detector is positioned so as to operate upon a crown cap at a point similarly remote from the point where the pad is placed over the crown cap. Referring more in detail to the Figure 24, the spaces between the adjacent ribs on the feed shaft have been numbered 1 to 8 and this would indicate the position of eight crown caps if the feed line is full of crown caps. Let us assume that the machine has stopped with the star wheel, slide and conveyor shaft in the positions shown in this Figure 24, the distance from the center of one cap in the feed line to the center of the next cap is one and one-half inches. The detector is positioned so that it will operate upon the cap in position No. 1, and this will be ten and one-half inches from the point C where the pad is placed over the cap. The star wheel is so dimensioned that the pocket A is ten and one-half inches from this point C measured on the pitch line of the star wheel. At the same time that the above parts are in the position shown a crown cap in the conveyor is passed beneath the detector and the detector is raised which closes the switch, energizes the solenoid and this lowers the latch so that it engages the bar 81 on the reciprocating head.

Now let us start the machine. For every revolution of the conveyor shaft which moves the crown forward one and one-half inches the star wheel revolves one-tenth of a revolution which also equals one and one-half inches movement on the pitch line and at the same time the slide has moved through one-half of its cycle which is from its forward position to its rearward position so that a pad has dropped in front of the slide. The next revolution of the conveyor moves the cap forward another one and one-half inches. The star wheel revolves another one-tenth of a revolution which positions the pocket A in line with the slide which has moved forward and pushed the pad into the pocket A of the star wheel. It is obvious that six more revolutions of the conveyor shaft and six-tenths further revolution of the star wheel will advance both cap and pad to the point C where a rotating plunger will press the disc into the cap.

The slide makes a full cycle for every other crown on the conveyor and is timed so that it will be at the forward end of its cycle when the foot 100 is over the crowns in the spaces 1, 3, 5 and 7, and will be at the rear end of its stroke when the foot is over the spaces 2, 4, 6 and 8. If there is no crown in space 1 the foot will drop and the solenoid will be deenergized. The arm 86 at this time is over the high level on the cam lever 87 and the latch will be raised free of the reciprocating head 68 and the slide will remain at the forward end of its stroke and no pad will be placed in the star wheel. If there is a crown in the next following even space the solenoid will be energized but the reciprocating head will be at the rear end of its stroke and the slide at the forward end of its stroke or idle position. If there is a crown in the next odd space the solenoid will remain energized and the slide will be latched to the slide by the tapered end of the latch sliding over the bar 81. If there are crowns at odd spaces and no crown in the even space therebetween, the foot will drop into the even space and deenergize the solenoid, but the slide at this time is at the rear end of its cycle and the arm 86 over the low level of the cam lever 87 and the latch will not be raised. The raising of the latch as it moves onto the upper level will not stop the slide as it is moved toward the forward end of the cycle by the bar 81 engaging the shoulder 107 and not by the latch which is only active to move the slide from its forward position to its rearward position. As long as there are crowns in the odd spaces the slide will be reciprocated and place pads in the star wheel which in turn will place a pad over each crown. The crown in the even spaces receive their pads from the second pad feeding mechanism.

There is a similar detecting device employed in connection with the other pad feeding mechanism which places pads in the other alternate crown caps. It operates in the same way. Associated with this second named pad feeding mechanism is a detector which includes a detector shoe 108 (see Fig. 16). This shoe operates through a slot 108ª in plate 57ª. This detector shoe 108 is carried by an arm 109 mounted on a shaft pivotally supported on lugs 110 which are mounted on the base plate 57 of the first pad feeding mechanism. Directly above this arm 109 is a microswitch 111 which is likewise mounted on a bracket carried by the base plate 57. This micro-switch is connected through lines 112 with the solenoid at the second or No. 2 pad feeding mechanism.

*Pad seating mechanism*

Associated with each pad feeding mechanism is a device which engages the pad when it is placed over the cap and positively forces the pad down into the cap and seats it tightly against the adhesive within the cap. This seating mechanism is shown in Figures 16, 19, 20, 21 and 22. Mounted in brackets 113 and 114 is a shaft 115. This shaft 115 carries a gear 116 which meshes with a bevelled gear 117 mounted on the upper end of the shaft 61. Carried at the end of this shaft 115 is a rotating head 118. This rotating head 118 has a vertically extending recess 120. A cover plate 121 is attached to the head. This head and cover plate is provided with an opening therethrough for the shaft 115 and the head is secured to the shaft by means of a set screw 122. Located in the recess 120 is a sliding block 123. This sliding block has a guiding portion 124 which extends through a slot 125 in the cover plate 121. The sliding block is provided with a stub shaft 125ª on which is mounted a roller 126. Also attached to this block 123 is a cylindrical plunger 127. The sliding block just described is located at the upper end of the head 118 as viewed in Figure 19. At the lower end of the head is a similar sliding block having a guide member 128 carrying a roller 129 and a plunger 130. There is a spring 131 between the upper sliding block 123 and the shaft 115 which normally holds the sliding block 123 moved radially outwardly on the head 118 until the guiding portion 124 of the block contacts the upper end of the slot. There is a similar spring 132 which engages the block carrying the guiding member 128 and plunger 130 which normally holds the block moved radially outwardly until the guiding member 128 engages the end of the slot. Associated with these plungers is a stationary cam 133. This cam is mounted on the extension 134 of the base plate 57. The cam is located close to one side of the slot between the cover plates. The cam is so shaped and disposed that as the head 118 rotates, the rollers 126 and 129 will engage the cam in succession. The cam will force the block 123 upwardly toward the shaft 115 and when the rollers run off the end of the cam 133 the plunger will then be released and the spring will quickly force the plunger downwardly into engagement with the pad and will positively force the pad into the crown beneath the same and against the adhesive face of the crown. The plunger moves in timing with the caps which are moving at a uniform speed.

There are two of these plungers which are diametrically opposed and timed so that one plunger operates on the pad placed over a cap and then the next plunger will operate on the pad placed over the alternately spaced cap. There is a similar pad seating device associated with the second pad feeding mechanism and, of course, the plungers are timed so as to seat the pads placed in the caps by this second pad feeding mechanism.

*Cap ejecting mechanism*

Figures 19, 20, 21, 22, 23:
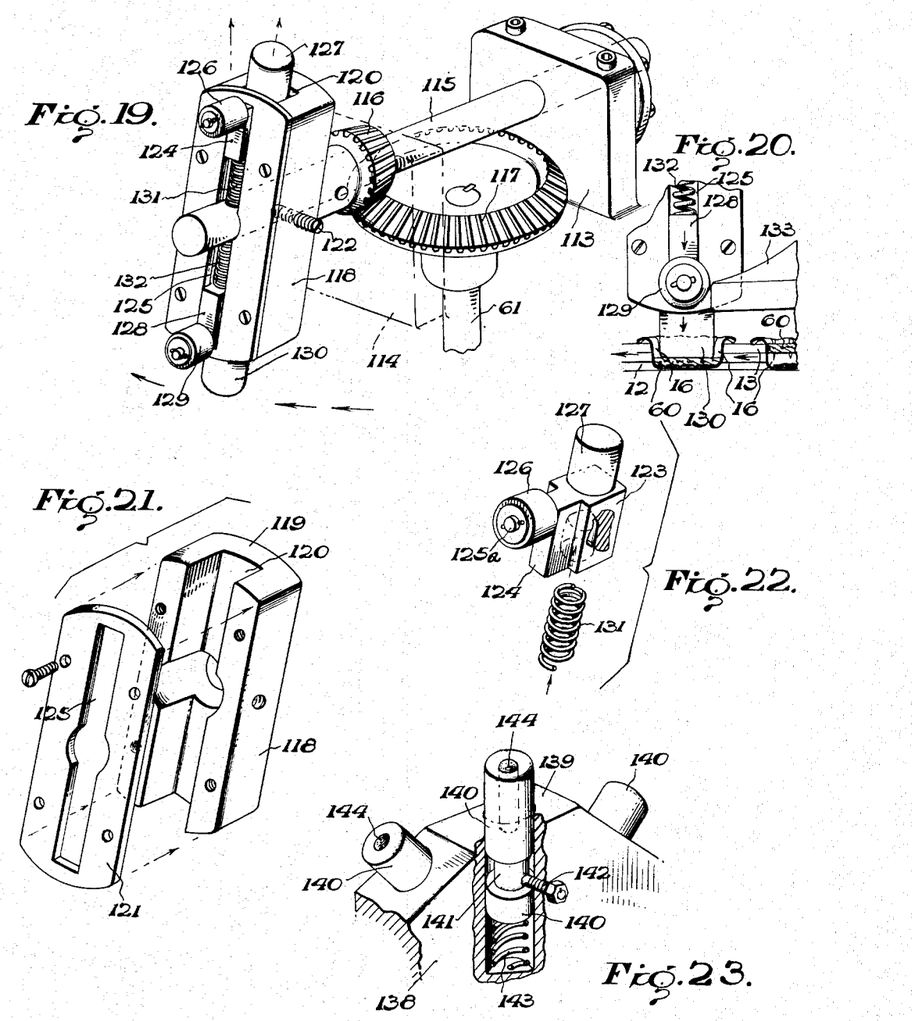
Figure 19 is a view in perspective showing the plunger as having seated the pad in the crown cap and about to be withdrawn therefrom.
Figure 20 is a side view showing the plunger which forces the pad into the cap as it is being released from the control cam therefor and forced into the crown.
Figure 21 is a perspective view showing the guiding structure for the plungers which seat the pads in the caps.
Figure 22 is a view in perspective showing one of the plungers, the guiding support therefor, the roller carried thereby and the spring which forces the plunger in the crown when the roller leaves the control cam.
Figure 23 is a view partly in perspective and partly in section showing a portion of the detector device and the manner of supporting and yieldingly operating the magnets therein.

Disposed along the feed line is a cap ejecting mechanism which operates on each crown cap after it passes the pad inserting mechanism and will eject from the machine any caps which do not have pads inserted therein. This cap ejecting mechanism is shown in Figures 8 and 23 and in a general way in Figures 1, 2 and 6. Mounted in a housing 136 carried by the center plate 12 is a shaft 137. This shaft is driven by gearing from the main shaft 20. (See Figure 6.) Mounted on each end of the shaft is the ejector. One of the ejectors is directly over one of the feed lines and operates upon the caps moving along the same and the others over the other feed line. These ejectors are similar in construction. Each ejector includes a disc 138 having a series of flat sides 139. There is a radial bore in the disc at each flat side and mounted in this radial bore and projecting from the flat surface 139 is a plunger 140. This plunger has a reduced portion 141 between the ends thereof and a stop screw 142 threaded into the disc lies between the opposed shoulders of the reduced portion. A spring 143 mounted in the bore bears against the inner end of the bore and against the plunger 140 and normally holds the plunger forced outwardly until the inner shoulder engages the stop screw 142. Mounted in the end of the plunger is a magnet 144. These plungers are spaced and timed so that they move into the crown caps in succession. If there is a pad in the cap then the plunger will yield and merely press the pad tighter against the inner face of the crown cap. If, however, there is no pad in the cap then the plunger head will move sufficiently close to the inner face of the cap that the magnet will lift the cap into engagement with the plunger. The nails or cover plates 14 and 15 are cut away to permit the magnets to lift the caps from the feed shaft.

Located at the side of the ejector are stationary stripper plates 145, 145. These stripper plates are spaced from each other so that the plungers will move along the slot between the stripper plates. The stripper plates are curved outwardly and will operate to engage a cap carried by the magnet and strip the cap from the magnet so that it will fall into the discharge chute 146. The chute and the stripper plates are mounted on a bracket 147 carried by the center plate 12.

As the crown caps move along the feed line these plungers move into a crown cap in succession. They engage the crown cap centrally thereof and if there is a pad the plunger will press the pad against the inner face of the cap, the spring 143 yielding to permit this movement. If there is no pad, then, as noted above, the plunger will pick up the cap and carry it along the stripper plates and strip the cap from the plunger and it will be discharged from the machine.

*Pressed mechanisms wherein adhesive is heated and set*

After the pads have been placed in the crown caps they are then fed into the presser wheel where a plunger enters the cap and presses the pad against the inner face of the top of the cap and the top of the cap in turn against a projecting flange on the presser wheel. There is a heating means associated with the presser wheel which heats the flange and thus transfers heat to the flange and the cap for heating the adhesive and setting the same. After the adhesive has been heated sufficiently to set the adhesive then the cap is removed from the presser wheel and is ready for use.

There is only one presser wheel for the two feed lines. This presser wheel is carried by a shaft 148 and the shaft in turn is mounted in bearings carried by spaced brackets 149 mounted on the frame 10.

Figures 3, 4, 5:
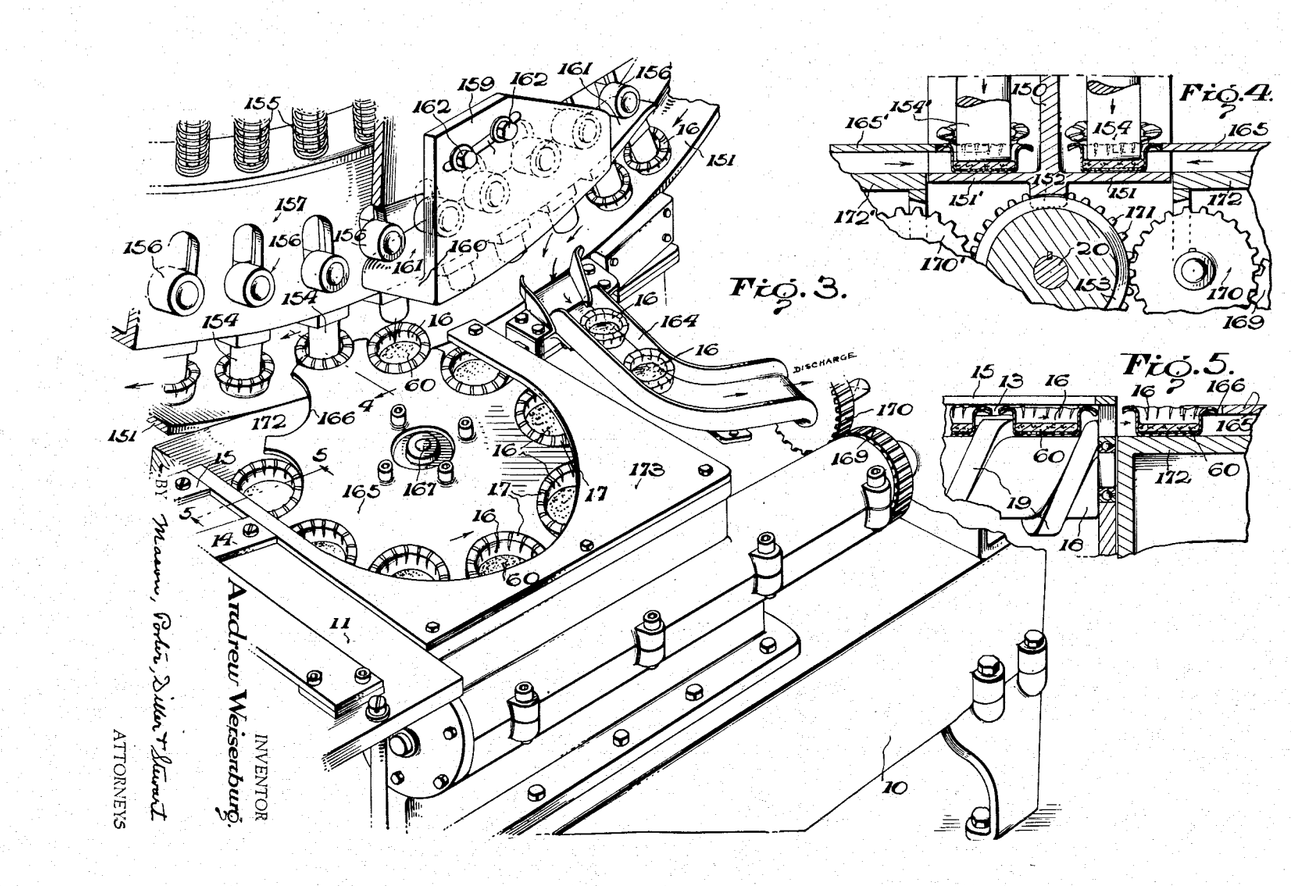
Figure 3 is a view in perspective showing a portion of the presser wheel, the feeding means for placing the crown caps with the pads therein beneath plungers and the cam for releasing the caps and discharging the same from the machine.
Figure 4 is a sectional view on the line 4—4 of Figure 3.
Figure 5 is a sectional view on the line 5—5 of Figure 3.

The presser wheel has a central web 150 (see Figure 4), from each side of which extend flanges 151 and 151'. The central web carries a gear 152 which meshes with a worm gear 153 on the main shaft 20. Mounted on the web of the presser wheel are a series of radially disposed plungers 154. There are plungers on each side of the wheel and they are located inside of the flanges 151 and 151' respectively. Associated with each plunger is a spring 155 which normally moves the plunger radially outwardly so that when it enters a crown cap it will press the cap against the flange as shown in Figure 4. Each plunger carries a stub shaft on which is mounted a roller 156. The stub shaft extends through slots in a plate 157 and the rollers are located just outside of the plates.

There is a web 158 on which is mounted a plate 159 carrying an inwardly projecting member 160 having a cam face 161. This plate 159 carrying the cam is secured to the web 158 by bolts 162, 162 passing through a slot 163 in the cam supporting plate. This permits the cam supporting plate to be adjusted.

This cam is so shaped and positioned that as the plungers approach the cam the roller 156 runs up onto the upper face of the cam. (See Figure 3.) If the plunger is pressing a cap against the flange 151 it will be lifted from the cap as the roller moves along the cam and this will release the cap so that it will be discharged into a chute 164. The plunger remains in its retracted position to which it has been moved by the cam and a star wheel 165 places caps on the flange so that when the plunger runs off from the cam it will move into the cap contacting the cap and press the pad tightly against the adhesive on the inner surface of the top of the cap and press the cap in turn against the flange 151. There is, of course, a similar cam operating on the plungers on the other side of the presser wheel and a similar star wheel for feeding caps onto the flange and a chute for receiving caps from the flange.

The star wheel 165 is provided with a series of pockets 166. The star wheel is rotated by a center shaft 167 on which the star wheel is mounted. The shaft 167 carries a worm gear meshing with a spiral gear on a shaft 168 and the shaft 168 carries a gear 169 which meshes with an idle gear 170 and the idle gear 170 in turn meshes with a gear 171 on the shaft 20. The feed shaft 18 feeds the crown caps with the pads therein into the pocket 166 of the star wheel 165.

Directly beneath the star wheel is a supporting plate 172. This supporting plate extends all the way around and is in alignment with the flange 151 at the position where the caps are moved onto the flange. There is a cover plate 173 which overlies the crown caps in the pockets and retains them therein until they are delivered onto the flange 151 of the presser wheel. It is noted that the spiral rib 19 on the feed shaft 18 moves the cap positively into the pocket in the star wheel and the star wheel positively places the caps on the flange 151. The operation is the same on both star wheels but, of course, the star wheels are fed with caps independently from the two feed lines.

Associated with each flange on the presser wheel is a pipe 174. Mounted on the brackets supporting the presser wheel is a standard 174a. There is one on each side of the wheel and these standards support these pipes. These pipes have openings on their inner face which form a gas jet burner. The flame of the gas jet is directed against the outer face of the flange 151 and likewise the gas jets on the other side of the presser wheel are directed against the flange 151'. These gas jets extend only partially around the presser wheel but for a sufficient distance so that the heated flange will transfer heat to the top portion of the crown cap and through the top portion to the adhesive on the inner face thereof. The gas jets terminate some little distance from the discharge point so that the adhesive will cool sufficiently so as to set before the cap and the pad therein is discharged from the machine.

The pad feeding mechanism and the detector mechanism associated therewith per se form no part of the present invention but are shown, described and claimed in detail in my copending application Serial Number 377,293, filed August 31, 1953. The presser wheel and the means for transferring the caps from the feed shaft having the spiral rib to the plungers of the presser wheel per se forms no part of the present invention but is shown, described and claimed in detail in my copending application, Serial Number 377,341, filed August 31, 1953.

*Operation*

The operation of the improved pad applying machine for crown caps is thought to be obvious from the detailed description and the operation of the various units employed in the machine. However, a brief description of the main features and the cooperation of the units will be described. The crown caps are fed from a hopper into a feeding chute with the crowns all facing one way so that the caps will be delivered from the chute with the flanges uppermost and the crown depending therefrom. The caps are retained in the chute by a spring pressed pin which will yield to pressure and permit the caps to be removed from the chute one at a time. A rotating transfer device having a series of arms is so mounted and timed as to engage the caps one after another and strip them from the chute and place the cap in the supporting guideway therefor. The caps are moved along the guideway in a straight line path of travel by a feed shaft having a spiral rib of uniform helix angle. The plungers are timed so that when the caps are placed in the guideway therefor they are also placed in proper timing to the rotation of the feed shaft so that the rib on the feed shaft will pass in rear of the crown of the cap and will move the cap along the guideways at a continuous uniform speed of movement. The caps are first presented to an adhesive applying device which includes a plurality of radially disposed plungers having pads on the outer ends thereof which contact with the adhesive applying cylinder and then with the moving cap for transferring the adhesive to the inner face of the top of the cap. The caps are next fed to the first pad supplying mechanism wherein pads are placed in alternate caps, after which the cap is fed to a second pad insertion station where pads are placed in the alternate caps which have no pads.

Associated with this pad supplying mechanism is a detecting device controlled by the passing caps in the feed line which renders the pad supplying mechanism inoperative when there is no cap in the feed line to receive the pad. Also associated with the pad supplying mechanism which places the pad over the moving cap is a rotating device including plungers which move into engagement with the placed pad and forces the same into the cap. After leaving the pad supplying mechanism the caps with the pads therein move beneath a rejecting device including a series of plungers which engage each moving cap and if there is no pad in the cap it will reject the cap from the machine. After leaving this rejecting mechanism the caps with pads therein are delivered to the pockets of a star wheel disposed at the end of the guideways for the caps and the end of the feed shaft with the spiral rib thereon. It is the spiral rib on the feed shaft which places the cap in the pocket of the star wheel. The star wheel delivers the caps with the pads therein to a presser wheel having plungers which engage within the caps and press the pad into engagement with the adhesive in the cap. The presser wheel has a projecting flange beneath the plungers and the cap is pressed by the plungers against the inner face of the flange. Disposed along a portion of the periphery of the flange on the rotating presser wheel is a heating device which heats the flange and the heated flange in turn transfers heat to the cap and the adhesive for aiding in the setting of the adhesive. After the adhesive has been heated it is permitted to cool and set after which it is discharged from the presser wheel and from the machine.

I claim:

1. A machine for attaching sealing pads to crown caps comprising spaced plates extending from one end of the machine to the other and having guideways for receiving and supporting inverted caps by the flanges thereof and for guiding the caps in a straight line of travel, a rotating feed shaft having its axis parallel with said guideways, said shaft having a spiral rib of uniform helix angle thereon adapted to engage the caps and impart a uniform continuous feeding movement thereto along said guideways, means for placing an adhesive in the caps, mechanism for placing sealing pads over the moving caps, devices traveling in timing relationship with the caps for inserting the pads in the caps while moving, a presser mechanism having means for holding the pad seated in the caps, means for setting the adhesive, and means for receiving the caps from the guideways and for placing the same in the presser mechanism.

2. A machine for attaching sealing pads to crown caps comprising spaced plates extending from one end of the machine to the other and having guideways for receiving and supporting inverted caps by the flanges thereof and for guiding the caps in a straight line of travel, a rotating feed shaft having its axis parallel with said guideways, said shaft having a spiral rib of uniform helix angle thereon adapted to engage the caps and impart a uniform continuous feeding movement thereto along said guideways, means for placing an adhesive in the caps, means operating in timing relationship with the moving caps for placing sealing pads over said caps, independent devices traveling in timing relationship with the caps for engaging the pads in the placing means and forcing said pads into the caps while they are moving, a presser mechanism having means for holding the pad seated in the caps, means for setting the adhesive, and means for receiving the caps from the guideways and for placing the same in the presser mechanism.

3. A machine for attaching sealing pads to crown caps comprising spaced plates extending from one end of the machine to the other and having guideways for receiving and supporting inverted caps by the flanges thereof and for guiding the caps in a straight line of travel, a rotating feed shaft having its axis parallel with said guideways, said shaft having a spiral rib of uniform helix angle thereon adapted to engage the caps and impart a uniform continuous feeding movement thereto along said guideways, a feed chute for delivering caps to the guideways, yielding means for retaining the caps in the chute, rotating means including a series of plungers adapted to successively enter the caps for withdrawing the caps one at a time from the chute for positively positioning the caps in said guideways in timing relationship for engagement by the spiral rib on the feed shaft, means for placing an adhesive in the moving caps, means for placing sealing pads in the moving caps, a presser mechanism having means for holding the pad seated in the caps, means for setting the adhesive, and means for receiving the caps from the guideways and for placing the same in the presser mechanism.

4. A machine for attaching sealing pads to crown caps comprising spaced plates extending from one end of the machine to the other and having guideways for receiving and supporting inverted caps by the flanges thereof and for guiding the caps in a straight line of travel, a rotating feed shaft having its axis parallel with said guideways, said shaft having a spiral rib of uniform helix angle thereon adapted to engage the caps and impart a uniform continuous feeding movement thereto along said guideways, a feed chute for delivering caps to the guideways, yielding means for retaining the caps in the chute, rotating means including a series of plungers adapted to successively enter the caps for withdrawing the caps one at a time from the chute for positively positioning the caps in said guideways in timing relationship for engagement of the spiral rib on the feed shaft, means for placing an adhesive in the moving caps, means for placing sealing pads over the moving caps, devices traveling in timing relationship with the caps for inserting the pads therein, a presser mechanism having means for holding the pad seated in the caps, means for setting the adhesive, and means for receiving the caps from the guideways and for placing the same in the presser mechanism.

5. A machine for attaching sealing pads to crown caps comprising spaced plates extending from one end of the machine to the other and having guideways for receiving and supporting inverted caps by the flanges thereof and for guiding the caps in a straight line of travel, a rotating feed shaft having its axis parallel with the guideways, said shaft having a spiral rib of uniform helix angle thereon adapted to engage caps and impart a uniform continuous feeding movement thereto along said guideways, means for placing adhesive in the caps, mechanism for placing the sealing pads over the moving caps, devices traveling in timing relationship with the caps for inserting the pads in the caps while moving, a detector mechanism controlled by the passing caps for rendering the pad placing mechanism inoperative when there is no cap to receive the pad, a presser mechanism having means for holding the pad seated in the caps, means for setting the adhesive, and means for receiving the caps from the guideways and for placing the same in the presser mechanism.

6. A machine for attaching sealing pads to crown caps comprising spaced plates extending from one end of the machine to the other and having guideways for receiving and supporting inverted caps by the flanges thereof and for guiding the caps in a straight line of travel, a rotating feed shaft having its axis parallel with said guideways, said shaft having a spiral rib of uniform helix angle thereon adapted to engage the caps and impart a uniform continuous feeding movement thereto along said guideways, means for placing an adhesive in the caps, independent pad feeding devices timed so as to place pads over alternate crowns, means associated with each pad feeding device while in said device for forcing the pads into the moving caps, a presser mechanism having means for holding the pad seated in the caps, means for setting the adhesive, and means for receiving the caps from the guideways and for placing the same in the presser mechanism.

7. A machine for attaching sealing pads to crown caps comprising spaced plates extending from one end of the machine to the other and having guideways for receiving and supporting inverted caps by the flanges thereof and for guiding the caps in a straight line of travel, a rotating feed shaft having its axis parallel with said guideways, said shaft having a spiral rib of uniform helix angle thereon adapted to engage the caps and impart a uniform continuous feeding movement thereto along said guideways, means for placing an adhesive in the caps, a pad feeding device timed so as to place pads over alternate crowns, a second pad feeding device timed so as to place pads over alternate empty crowns in the feed line, means associated with each pad feeding device for engaging the pads in the placing device and forcing the same into the moving caps, a detector mechanism associated with each pad feeding device and controlled by the passing caps for rendering the pad feeding mechanism with which it is associated inoperative when there is no cap to receive the pad, a presser mechanism having means for holding the pad seated in the caps, means for setting the adhesive, and means for receiving the caps from the guideways and for placing the same in the presser mechanism.

8. A machine for attaching sealing pads to crown caps comprising spaced plates extending from one end of the machine to the other and having guideways for receiving and supporting inverted caps by the flanges thereof and for guiding the caps in a straight line of travel, a rotating feed shaft having its axis parallel with said guideways, said shaft having a spiral rib of uniform helix angle thereon adapted to engage the caps and impart a uniform continuous feeding movement thereto along said guideways, a feed chute, means for engaging the caps while in the chute and positively positioning the caps in the guideways and in timed relationship for engagement by the spiral rib on the feed shaft, means for placing an adhesive in the caps, means operating in timing relationship with the moving caps for placing sealing pads over said caps, devices traveling in timing relationship with the caps for inserting the pads in the caps while they are moving, a rotating rejector having plungers adapted to move in succession into the moving caps, means cooperating with the plungers for lifting the caps having no pads therein from the feed line and discharging the same from the machine, a presser mechanism having means for holding the pad seated in the caps, means for setting the adhesive, and means for receiving the caps from the guideways and for placing the same in the presser mechanism.

9. A machine for attaching sealing pads to crown caps comprising spaced plates extending from one end of the machine to the other and having guideways for receiving and supporting inverted caps by the flanges thereof and for guiding the caps in a straight line of travel, a rotating feed shaft having its axis parallel with said guideways, said shaft having a spiral rib of uniform helix angle thereon adapted to engage the caps and impart a uniform continuous feeding movement thereto along said guideways, means for placing an adhesive in the caps, a pad feeding device timed so as to place pads over alternate caps, a second pad feeding device timed so as to place pads over the alternate empty caps in the feed line, means associated with each pad feeding device for engaging the pads while in the placing device and forcing the same into the moving caps, a detector mechanism associated with each pad feeding device and controlled by the passing caps for rendering the pad feeding device with which it is associated inoperative when there is no cap to receive the pad, a rotating rejector having plungers adapted to move in succession into the moving caps, means cooperating therewith for lifting the caps having no pads therein from the feed line and discharging the same from the machine, a presser mechanism having means for holding the pad seated in the caps, means for setting the adhesive, and means for receiving the caps from the guideways and for placing the same in the presser mechanism.

References Cited in the file of this patent

UNITED STATES PATENTS

| Number | Name | Date |
|---|---|---|
| 1,087,711 | Bogdanffy | Feb 17, 1914 |
| 1,574,913 | McManus | Mar. 2, 1926 |
| 1,735,609 | Frederick | Nov. 12, 1929 |
| 2,138,923 | Johnson | Dec. 6, 1938 |
| 2,471,255 | Weisenburg | May 24, 1949 |
| 2,522,577 | Johnson et al. | Sept. 19, 1950 |
| 2,538,887 | Smith | Jan. 23, 1951 |